(12) United States Patent
Collins

(10) Patent No.: US 9,835,856 B2
(45) Date of Patent: Dec. 5, 2017

(54) ADAPTIVE OPTIC HAVING MEANDER RESISTORS

(71) Applicant: Raytheon Company, Waltham, MA (US)

(72) Inventor: Steven R. Collins, Lexington, MA (US)

(73) Assignee: Raytheon Company, Waltham, MA (US)

( * ) Notice: Subject to any disclaimer, the term of this patent is extended or adjusted under 35 U.S.C. 154(b) by 133 days.

(21) Appl. No.: 14/780,580

(22) PCT Filed: May 24, 2013

(86) PCT No.: PCT/US2013/042638
§ 371 (c)(1),
(2) Date: Sep. 28, 2015

(87) PCT Pub. No.: WO2014/189522
PCT Pub. Date: Nov. 27, 2014

(65) Prior Publication Data
US 2016/0077333 A1    Mar. 17, 2016

(51) Int. Cl.
*G02B 27/00* (2006.01)
*G02F 1/1345* (2006.01)
*G02B 26/06* (2006.01)

(52) U.S. Cl.
CPC ......... *G02B 27/0068* (2013.01); *G02B 26/06* (2013.01); *G02B 27/0025* (2013.01);
(Continued)

(58) Field of Classification Search
CPC  G02B 27/0068; G02B 27/0025; G02B 26/06; G02F 1/1345
See application file for complete search history.

(56) References Cited

U.S. PATENT DOCUMENTS

| 4,135,789 A | 1/1979 | Hall |
| 4,141,651 A | 2/1979 | Smith et al. |

(Continued)

FOREIGN PATENT DOCUMENTS

| JP | 10-048660 | 2/1998 |
| JP | 2002-227130 | 8/2002 |

(Continued)

OTHER PUBLICATIONS

Response to Canadian Office Action dated Oct. 26, 2016 for Canadian Application No. 2,910,592;as filed on Jan. 24. 2017; 7 pages.

(Continued)

*Primary Examiner* — Anne Hines
(74) *Attorney, Agent, or Firm* — Daly, Crowley, Mofford & Durkee, LLP

(57) ABSTRACT

An A liquid-crystal adaptive optics actuator comprising a two-dimensional array of pixels (14), wherein each pixel (14) is connected to a control circuit by means of a control line signal path (16, 20) that comprises an electrical interconnection (16) and a meandering resistor (20), each resistor having a resistance value selected to equalize the RC time constant of each control line signal path associated to each pixel. Each control line is thus capable of carrying one or more control signals and the control line signal path is configured such that all the pixels respond to the control signals with a uniform response time.

13 Claims, 4 Drawing Sheets

(52) U.S. Cl.
CPC ........ *G02F 1/1345* (2013.01); *G02F 2203/18* (2013.01); *G02F 2203/50* (2013.01); *G09G 2300/0426* (2013.01); *G09G 2320/0223* (2013.01)

(56) References Cited

U.S. PATENT DOCUMENTS

| | | |
|---|---|---|
| 4,229,106 A | 10/1980 | Dorschner et al. |
| 4,284,329 A | 8/1981 | Smith et al. |
| 4,418,102 A | 11/1983 | Ferrato |
| 4,482,249 A | 11/1984 | Smith, Jr. et al. |
| 4,525,028 A | 6/1985 | Dorschner |
| 4,545,650 A | 10/1985 | Kirkman et al. |
| 4,548,501 A | 10/1985 | Smith et al. |
| 4,684,219 A | 8/1987 | Cox et al. |
| 4,687,331 A | 8/1987 | Holz et al. |
| 4,695,490 A | 9/1987 | McClelland et al. |
| 4,813,766 A | 3/1989 | Keene et al. |
| 4,813,774 A | 3/1989 | Dorschner et al. |
| 4,818,087 A | 4/1989 | Dorschner |
| 4,882,235 A | 11/1989 | Resler |
| 4,943,709 A | 7/1990 | Grinberg et al. |
| 4,964,251 A | 10/1990 | Baughman et al. |
| 4,964,701 A | 10/1990 | Dorschner et al. |
| 5,004,343 A | 4/1991 | Dorschner et al. |
| 5,018,835 A | 5/1991 | Dorschner |
| 5,084,898 A | 1/1992 | Dorschner et al. |
| 5,093,740 A | 3/1992 | Dorschner et al. |
| 5,093,747 A | 3/1992 | Dorschner |
| 5,126,869 A | 6/1992 | Lipchak et al. |
| 5,151,814 A | 9/1992 | Grinberg et al. |
| 5,216,729 A | 6/1993 | Berger et al. |
| 5,233,673 A | 8/1993 | Vali et al. |
| 5,241,995 A | 9/1993 | Farrell |
| 5,246,042 A | 9/1993 | Farrell |
| 5,253,033 A | 10/1993 | Lipchak et al. |
| 5,276,747 A | 1/1994 | Pan |
| 5,309,263 A | 5/1994 | Sato |
| 5,333,046 A | 7/1994 | Smith et al. |
| 5,363,228 A | 11/1994 | DeJule et al. |
| 5,404,365 A | 4/1995 | Hiiro |
| 5,412,475 A | 5/1995 | Smith et al. |
| 5,559,619 A | 9/1996 | Sato |
| 5,740,288 A | 4/1998 | Pan |
| 5,963,682 A | 10/1999 | Dorschner et al. |
| 6,013,339 A | 1/2000 | Yamada et al. |
| 6,099,970 A | 8/2000 | Bruno et al. |
| 6,103,604 A | 8/2000 | Bruno et al. |
| 6,246,369 B1 | 6/2001 | Brown et al. |
| 6,282,224 B1 | 8/2001 | Smith et al. |
| 6,473,148 B1 | 10/2002 | Suh |
| 6,490,076 B2 | 12/2002 | Pepper |
| 6,545,563 B1 | 4/2003 | Smith |
| 6,597,836 B2 | 7/2003 | Johnson et al. |
| 6,673,497 B2 | 1/2004 | Efimov et al. |
| 6,704,474 B1 | 3/2004 | Dorschner et al. |
| 6,710,736 B2 | 3/2004 | Fullerton et al. |
| 6,810,164 B2 | 10/2004 | Dorschner et al. |
| 6,861,270 B2 | 3/2005 | Sakai |
| 6,884,647 B2 | 4/2005 | Sakai et al. |
| 6,908,026 B2 | 6/2005 | Hanna et al. |
| 6,974,517 B2 | 12/2005 | Hanna |
| 6,988,338 B1 | 1/2006 | Chen et al. |
| 7,005,685 B2 | 2/2006 | Sakai et al. |
| 7,006,747 B2 | 2/2006 | Escuti et al. |
| 7,015,511 B2 | 3/2006 | Sakai et al. |
| 7,046,326 B2 | 5/2006 | Austin et al. |
| 7,095,925 B2 | 8/2006 | Grunnet-Jepson et al. |
| 7,166,182 B2 | 1/2007 | Pereira et al. |
| 7,196,758 B2 | 3/2007 | Crawford et al. |
| 7,215,472 B2 | 5/2007 | Smith et al. |
| 7,226,850 B2 | 6/2007 | Hoke et al. |
| 7,352,428 B2 | 4/2008 | Anderson et al. |
| 7,355,671 B2 | 4/2008 | Anderson et al. |
| 7,365,369 B2 | 4/2008 | Nakamura et al. |
| 7,428,100 B2 | 9/2008 | Smith et al. |
| 7,557,378 B2 | 7/2009 | LaRoche et al. |
| 7,570,310 B2 | 8/2009 | Harada et al. |
| 7,692,759 B2 | 4/2010 | Escuti et al. |
| 7,848,370 B2 | 12/2010 | Kewitsch et al. |
| 7,889,767 B2 | 2/2011 | Betin et al. |
| 7,990,660 B2 | 8/2011 | Zhang et al. |
| 8,268,707 B2 | 9/2012 | Resler et al. |
| 2001/0033400 A1 | 10/2001 | Sutherland et al. |
| 2002/0186919 A1 | 12/2002 | Pepper |
| 2004/0135956 A1 | 7/2004 | Kim et al. |
| 2005/0018954 A1 | 1/2005 | Vinouze et al. |
| 2005/0031264 A1 | 2/2005 | Volodin et al. |
| 2005/0069245 A1 | 3/2005 | Mitchell et al. |
| 2006/0033995 A1 | 2/2006 | Smith et al. |
| 2006/0210219 A1 | 9/2006 | Takahashi et al. |
| 2007/0014517 A1 | 1/2007 | Rizoiu et al. |
| 2007/0030294 A1 | 2/2007 | Sawyers et al. |
| 2007/0285370 A1 | 12/2007 | Kim |
| 2008/0129945 A1 | 6/2008 | Kim |
| 2009/0029071 A1 | 1/2009 | Nakayama et al. |
| 2009/0044496 A1 | 2/2009 | Botelho et al. |
| 2009/0058788 A1* | 3/2009 | Ha ................... G09G 3/3611 345/99 |
| 2009/0142073 A1 | 6/2009 | Smith et al. |
| 2010/0320474 A1 | 12/2010 | Resler et al. |
| 2012/0081621 A1 | 4/2012 | Dorschner et al. |
| 2014/0268328 A1 | 9/2014 | Dorschner et al. |
| 2015/0146139 A1 | 5/2015 | Smith et al. |

FOREIGN PATENT DOCUMENTS

| | | |
|---|---|---|
| JP | 2003-322864 | 11/2003 |
| JP | 2005-010737 | 1/2005 |
| JP | 2007-328346 | 12/2007 |
| JP | 2009-503621 A | 1/2009 |

OTHER PUBLICATIONS

Australian Second Patent Examination Report dated Nov. 10, 2016 for Australian Appl. No. 2013389971, 3 pages.

New Zealand Further Examination Report dated Nov. 29, 2016 for New Zealand Appl. No. 713761; 4 pages.

Response to Office Action dated Oct. 13, 2016 for U.S. Appl. No. 14/404,787, filed Dec. 13, 2016; 13 pages.

Response to First Examination Report dated Jun. 3, 2016 for New Zealand Application No. 713761; as filed on Oct. 27, 2016; 2 pages.

Response to First Examination Report dated Jun. 8, 2016 for Australian Application No. 2013389971 as filed on Oct. 27, 2016; 21 pages.

Notice of Allowance dated Feb. 8, 2017 for Canadian Appl. No. 2,874,616; 1 page.

Further Examination Report dated Feb. 28, 2017 for New Zealand Appl. No. 713761; 1 page.

Response to Japanese Office Action with English Translation dated Nov. 29, 2016 for Japanese Appl. No. 2016-513914 as filed on Feb. 22, 2017; 7 pages.

Voluntary Amendment as filed Feb. 15, 2016 for New Zealand Appl. No. 713761; 19 pages.

Further Examination Report dated Oct. 20, 2015 for New Zealand Appl. No. 702327; 2 pages.

Response to Rule 161 EPC Communication filed on Jul. 13, 2016 for EP Application No. EP13727011.2.

PCT International Preliminary Report on Patentability of the ISA dated Dec. 3, 2015 for Appl. No. PCT/US2013/042638; 8 pages.

Examiner's Report dated Nov. 27, 2015 for Appl. No. 2,874,616; 4 pages.

First Examination Report dated Jun. 3, 2016 for New Zealand Application No. 713761; 5 pages.

First Examination Report dated Jun. 8, 2016 for Australian Application No. 2013389971; 3 pages.

Response to Examiner's Report dated Nov. 27, 2015 for Canadian Application No. 2,874,616 as filed on Jan. 28, 2016; 13 pages.

Examiner Report dated Aug. 12, 2016 for Canadian Application No. 2,874,616; 3 pages.

(56) References Cited

OTHER PUBLICATIONS

NonFinal Office Action dated Jun. 8, 2016 for U.S. Appl. No. 14/404,787; 32 pages.
Response to Jun. 8, 2016 Office Action for U.S. Appl. No. 14/404,787, filed Sep. 8, 2016.
Voluntary Amendment for Australian Patent Application No. 2013389971 dated Dec. 24, 2015; 8 pages.
Response to Oct. 20, 2015 Further Examination Report as filed on Jan. 19, 2016 for New Zealand Appl. No. 702327; 61 pages.
English Translation of Japanese Office Action for Japanese Appl. No. 2016-513914 dated Nov. 29, 2016; 2 pages.
Dorschner; "Adaptive Photonic Phase Locked Elements;" An Overview; DARPA/MTO Symposium; Mar. 2007; pp. 1-15.
Kim, et al.; "Wide-angle, nonmechanical beam steering using thin liquid crystal polarization gratings;" Proc. of SPIE, vol. 7093; Jan. 2008, pp. 1-12.
McManamon, et al.; "A Review of Phased Array Steering for Narrow-Band Electrooptical System;" Proceeding of the IEEE; vol. 97; No. 6; Jun. 2009; pp. 1078-1096.
McManamon, et al., "Optical Phased Array Technology;" Proceedings of the IEEE; vol. 84; No. 2; Feb. 1996; pp. 268-298.
Miller; Self-aligning univeral beam coupler; Optics Express; vol. 21; No. 5; Mar. 11, 2013; pp. 6360-6370.
Nicolescu, et al.; "Polarization-independent tunable optical filters based on liquid crystal polarization gratings;" Proceedings of SPIE; vol. 6654; No. 665405; Aug. 2007; 12 pages.
Rockwell, et al.; "Semi-guiding high-aspect-ratio-core (SHARC) fiber providing single-mode operation and an ultra-large core area in a compact coliable package;" Optics Express; vol. 19; No. 15; Jul. 18, 2011; pp. 14746-14762.
International Preliminary Report on Patentability of the ISA for PCT/US2011/054245 dated Apr. 11, 2013.
Office Action dated Feb. 21, 2013 from U.S. Appl. No. 13/250,111.
Partial PCT Search Report received with Invitation to Pay Additional Fees in PCT/US2011/054245 dated Jan. 18, 2012.
PCT Search Report of the ISA for PCT/US2011/054245 dated Mar. 26, 2012.
Written Opinion of the ISA for PCT/US2011/054245 dated Mar. 26, 2012.
Response to Office Action dated Feb. 21, 2013 as filed on May 16, 2013 from U.S. Appl. No. 13/250,111.
Office Action dated Sep. 6, 2013 from U.S. Appl. No. 13/250,111.
Rule 161 Communication for Application No. 11770009.6 dated Jun. 12, 2013.
Response to Rule 161 Communication for Application No. 11770009.6 as filed on Dec. 23, 2013.
"Liquid crystal blazed-grating beam deflector," by Wang et al. Applied Optics, vol. 39, No. 35, pp. 6545-6555, 2000.
PCT Search Report of the ISA for PCT/US2013/042653 dated Nov. 7, 2013 6 pages.
Written Opinion of the ISA for PCT/US2013/042653 dated Nov. 7, 2013 9 pages.
PCT International Preliminary Report on Patentability for PCT/US2013/042653 dated May 24, 2013 10 pages.
Fan et al.; "Fast-Response and scattering-free polymer network liquid crystals for infrared light modulators;" Applied Physics Letters; American Institute of Physics; vol. 84; No. 8; Feb. 23, 2004; pp. 1233-1235.

Ren et al.; "Tunable Microlens arrays using polymers network liquid crystal;" Optics Communications; Science Direct; Sep. 22, 2003; pp. 267-271.
PCT International Preliminary Report on Patentability for PCT/US2013/042646 dated May 24, 2013 6 pages.
PCT Search Report of the ISA for PCT/US2013/042646 dated Sep. 3, 2013 5 pages.
Written Opinion of the ISA for PCT/US2013/042646 dated Sep. 3, 2013 4 pages.
PCT Invitation to Pay Additional Fees for PCT/US2013/042641 dated Sep. 20, 2013 10 pages.
Gelissen et al.; "Polarization Control Using Nematic Liquid Crystals;" Advances in Optical Information Processing; Proceedings of SPIE vol. 4046; Apr. 25, 2000; pp. 118-129.
PCT Search Report of the ISA for PCT/US2013/042641 dated Jan. 30, 2014 9 pages.
Written Opinion of the ISA for PCT/US2013/042641 dated Jan. 30, 2014 9 pages.
PCT International Preliminary Report of Patentability of PCT/US2013/042641 dated Dec. 4, 2014 11 pages.
U.S. Appl. No. 13/250,111, filed Sep. 30, 2011.
U.S. Appl. No. 13/801,411, filed Mar. 13, 2013.
Kanghua Lu, et al.; "Theory and design of the liquid crystal TV as an optical spatial phase modulator;" 2417 Optical Engineering; vol. 29; No. 3; Mar. 1, 1990; pp. 240-246.
Karim, et al.; "Electrooptic Displays for Optical Information Processing;" Proceedings of the IEEE; vol. 84; No. 6; Jun. 1, 1996; pp. 814-827.
Office Action for Application No. 2013266159 dated May 26, 2015; 3 pages.
Office Action for Application No. 702327 dated Mar. 24, 2015.
Search Report of the ISA for PCT/US2013/042638 dated Sep. 17, 2013.
Written Opinion of the ISA for PCT/US2013/042638 dated Sep. 17, 2013.
Response to Rules 161(1) and 162 EPC Communication dated Jan. 12, 2015 for EP Appl. No. 13732664.1.
U.S. Appl. No. 14/404,787, filed Dec. 1, 2014; 225 pages.
Response to New Zealand Office Action dated Sep. 22, 2015 for Appl. No. 702327; 64 pages.
Response to Aug. 12, 2016 Examiner's Report for Canadian Application No. 2,874,616 as filed on Sep. 28, 2016; 8 pages.
Response to Second Examination Report dated Nov. 29, 2016 for New Zealand Appl. No. 7137961 as filed on Jan. 30, 2017, 25 pages.
Response to Second Examination Report dated Nov. 10, 2016 for Australian Appl. No. 2013389971 as filed on Jan. 30, 2017; 2 pages.
Response to Australian Office Action dated Nov. 2, 2015 for Appl. No. 2013266159; 45 pages.
Notice of Allowance dated Jan. 3, 2017 for U.S. Appl. No. 14/404,787; 11 pages.
Canadan Office Action dated Oct. 26, 2016 for Canadian Application No. 2,910,592; 4 pages.
Office Action dated Oct. 13, 2016 from U.S. Appl. No. 14/404,787; 20 pages.
Further Examination Report Postponed Acceptance dated Feb. 5, 2016 for New Zealand Appl. No. 702327; 1 page.
Japanese Office Action (with English translation) dated Jun. 27, 2017 for JP Appl. No. 2016-513914; 8 pages.
Notice of Allowance dated Jul. 10, 2017 for Canadian Application No. 2,910,592; 1 page.

* cited by examiner

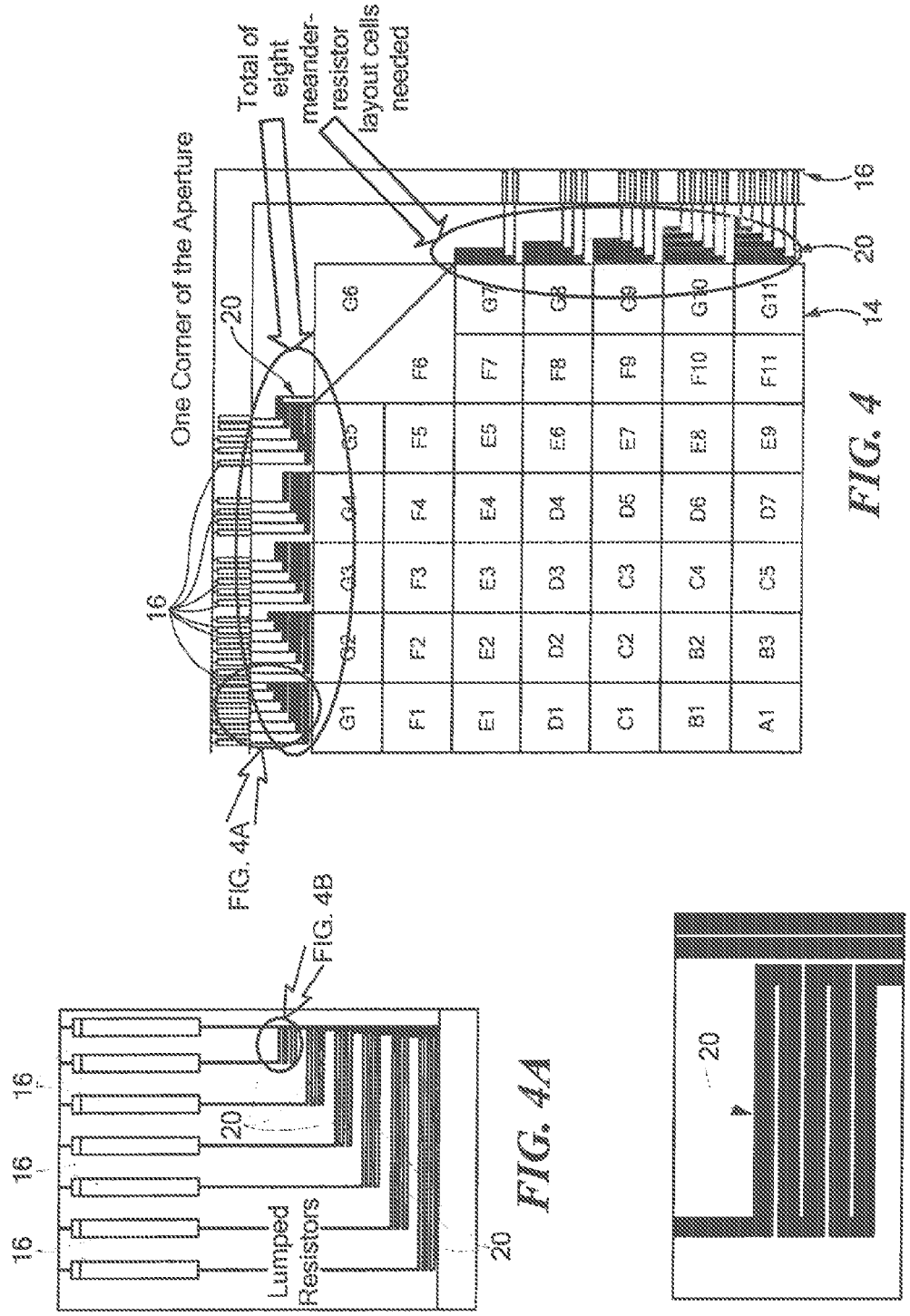

ADAPTIVE OPTIC HAVING MEANDER RESISTORS

GOVERNMENT RIGHTS

This work was supported by the Department of Defense under Contract No. FA8650-05-C-7211. The Government has certain rights in this invention.

CROSS REFERENCE TO RELATED APPLICATIONS

This application is a U.S. National Stage of PCT application PCT/US2013/042638 filed in the English language on May 24, 2013, and entitled "ADAPTIVE OPTIC HAVING MEANDER RESISTORS," which application is hereby incorporated herein by reference.

FIELD

The structures and techniques described herein relate to optical transmit-receive systems and more particularly to free-space laser/optical transmit-receive systems.

BACKGROUND

As is also known in the art, an adaptive optic (AO) actuator provides means to correct a phase front on a pixel by pixel level.

As is also known, conventional AO actuators operate as so-called "reflective-mode" devices and are typically implemented via deformable mirrors or MEMS mirrors. With exception of liquid crystal cells, all known technologies for realizing an AO are inherently limited to reflective-mode operation.

Use of reflective-mode AO devices often results in unnecessarily complicated optical layouts. Furthermore, reflective-mode AO actuators are generally larger and heavier than desired for many applications. Additionally, such reflective-mode AO actuators are not as fast as desired, do not handle phase fonts with phase discontinuities do not have sufficient spatial resolution, and do not handle high levels of optical power.

Also, all mechanically based AOs suffer interactuator modulation, whereby the setting of one pixel affects the setting of adjacent pixels. This prevents such AOs from correcting wavefronts with discontinuous phase, as is common in atmospheres with high levels of turbulence. MEMS-based devices (e.g. such a those manufactured by Boston MicroMachines) offer the smallest known interactuator coupling of about 13%.

Prior-art transmissive AOs based on liquid crystal technologies, which alleviate a number of the difficulties with mechanical AOs, are known but suffer from low bandwidth and also variable response time from pixel to pixel.

It would, therefore, be desirable to provide an AO actuator that is compact, lightweight, high speed or at least having pixel speeds constant across the aperture, and high power in the preferred transmission-mode embodiment, and which works well with discontinuous phase fronts.

SUMMARY

In accordance with the concepts, systems, components and techniques described herein, an adaptive optic actuator includes a two-dimensional array of pixels with each of the pixels comprising a meander-resistor with the layout of each meander-resistor selected to provide a uniform time constants to all pixels across the aperture.

With this particular arrangement, an adaptive optic having a specially designed electrode layout resulting in uniform time constants to all pixels across the aperture is provided.

In accordance with the concepts, systems, components and techniques described herein, an adaptive optic actuator includes a two-dimensional array of pixels with each of the pixels being furnished with a resistor having a resistance value selected to equalize an RC rise time to that pixel.

In accordance with the concepts, systems, components and techniques described herein, an adaptive optic actuator includes an array of pixels each of which is provided from a liquid crystal cell comprising: a superstrate having an inner surface; a substrate having an inner surface opposed to the surface of the superstrate; said substrate and superstrate having electrically conductive structures formed thereon and disposed as electrodes which permit different voltages to he applied to each pixel; an electrical signal path, capable of carrying one or more control signals, coupled to each pixel in said array of pixels, wherein each electrode signal path is provided having a path length and resistance such that a substantially uniform time constant is provided to all pixels across said array of pixels.

An adaptive optic actuator comprising a two-dimensional array of pixels each of the pixels having an associated control line signal path electrically coupled thereto with each control line signal path being furnished with a resistor having a resistance value selected to equalize an RC rise time to the associated pixel. With this arrangement, each control line is capable of carrying one or more control signals, and the control line signal path is configured such that a uniform time constant is provided to all pixels across the array of pixels.

In one embodiment, the pixels are provided having a square cross-sectional shape to better support the intended use of an AO with square beams.

As noted above in some embodiments, an electrode layout which results in uniform time constants to all pixels across the aperture is used. In an optical application in which square beams are used, the pixels are square to better support the intended. use of the AO with square beams. It should, of course, be appreciated that the concepts, systems and techniques described herein are not limited to square beams and that any beam shape may be used.

BRIEF DESCRIPTION OF THE DRAWINGS

The foregoing features of the circuits and techniques described herein, may be more fully understood from the following description of the drawings in which:

FIGS. 3 and 4 are a series of plan views of a portion of the AO actuator shown in FIGS. 1 and 2;

FIG. 4A is an expanded view of a portion of FIG. 4; and

FIG. 4B is an expanded view of as portion of FIG. 4A.

DETAILED DESCRIPTION OF THE PREFERRED EMBODIMENTS

Figure 1:
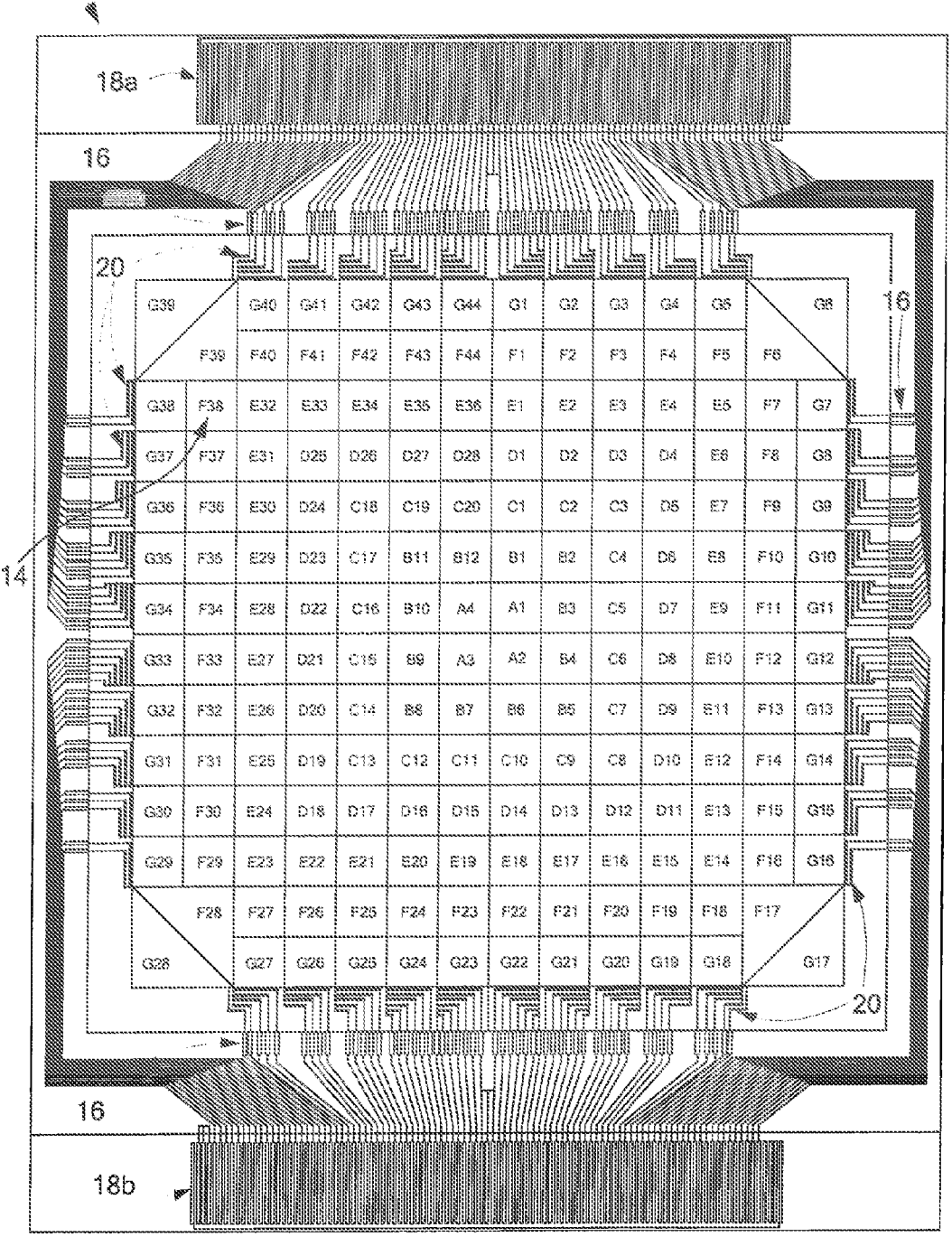
FIGS. 1 and 2 are a series of plan views of the electrically active substrate of an adaptive optic (AO) actuator.
Figure 2:
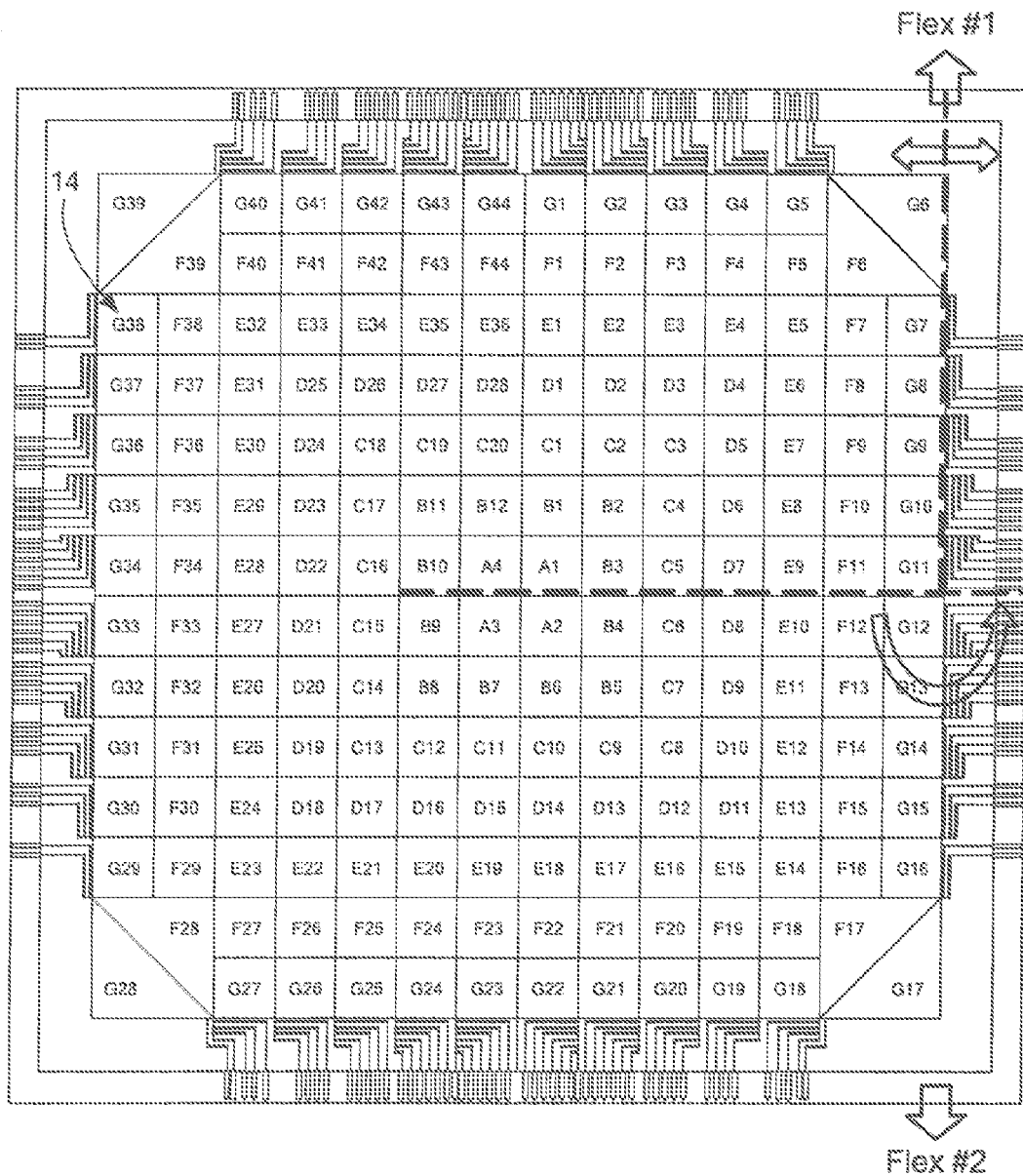

Referring now to FIG. 1-4B in which like elements are provided, having like reference designations throughout the several views, an adaptive optic (AO) comprises a voltage-addressable, transmission-mode, liquid-crystal (LC) cell, as is generally known in the art, having substrates 10 patterned into an array of independent pixels generally denoted 14 to support two-dimensional (2-D) addressing for use as an AO actuator. In addition to each pixel being denoted with reference numeral 14, it should be noted that each individual pixel in FIGS. 1-4B is also provided having a unique alpha-numeric designation (e.g. A1-A4; B1 -B12; C1 -C20, D1 -D28; E1 -E36, F1 -F44, G1 -G40).

In the exemplary embodiment of FIGS. 1-4B, the adaptive optic is provided having a plurality of pixels having various shapes (squares and triangles) and arranged in columns and rows. Each of the pixels is coupled to a corresponding one of an output of a control circuit (not shown in FIGS. 1-4B). It should be noted that control circuits may be disposed on a substrate of the LC, via "flip-chip" or other chip-on-glass assembly technique, or else the control circuits may he "off-glass". The control circuits are coupled to pixels 14 via electrical signal paths which coupled control signals to conductors disposed on the substrate. Electrical transitions 16 and compensating resistors 20 (also referred to as an RC balancing resistors) form a portion of such signal paths to the pixels 14. Such signal paths may also include, for example, a flex cable coupled to a controller or other signal source (not visible in FIG. 1). It should be noted that each pixel 14 is individually addressable via the leads which are very narrow and are not clearly shown on the figures, but which run from each compensating resistor to its corresponding pixel being routed in the narrow gaps between pixels. Thus the control circuit(s) are capable of providing one or more control signals to each of the pixels of the AO.

Each signal path coupled between the flex circuit and pixels includes an RC balancing resistor, generally denoted 20. In preferred embodiments the resistors are provided having a meander-resistor layout (FIG. 4B). The path lengths in the meander-resistor layout are selected so as to result in a substantially uniform speed in controlling pixels across the array. That is, the time it takes for any pixel in the AO pixel array to respond to a control signal is substantially the same regardless of pixel location within the AO. Since these response times are equal, any effects (such as decrease of RMS voltage arising from delay and attenuation between the voltage source and the pixel) will be equalized across all pixels, enabling compensation for such voltage decrease in the calibration tables already needed for any liquid-crystal device.

Figure 3:
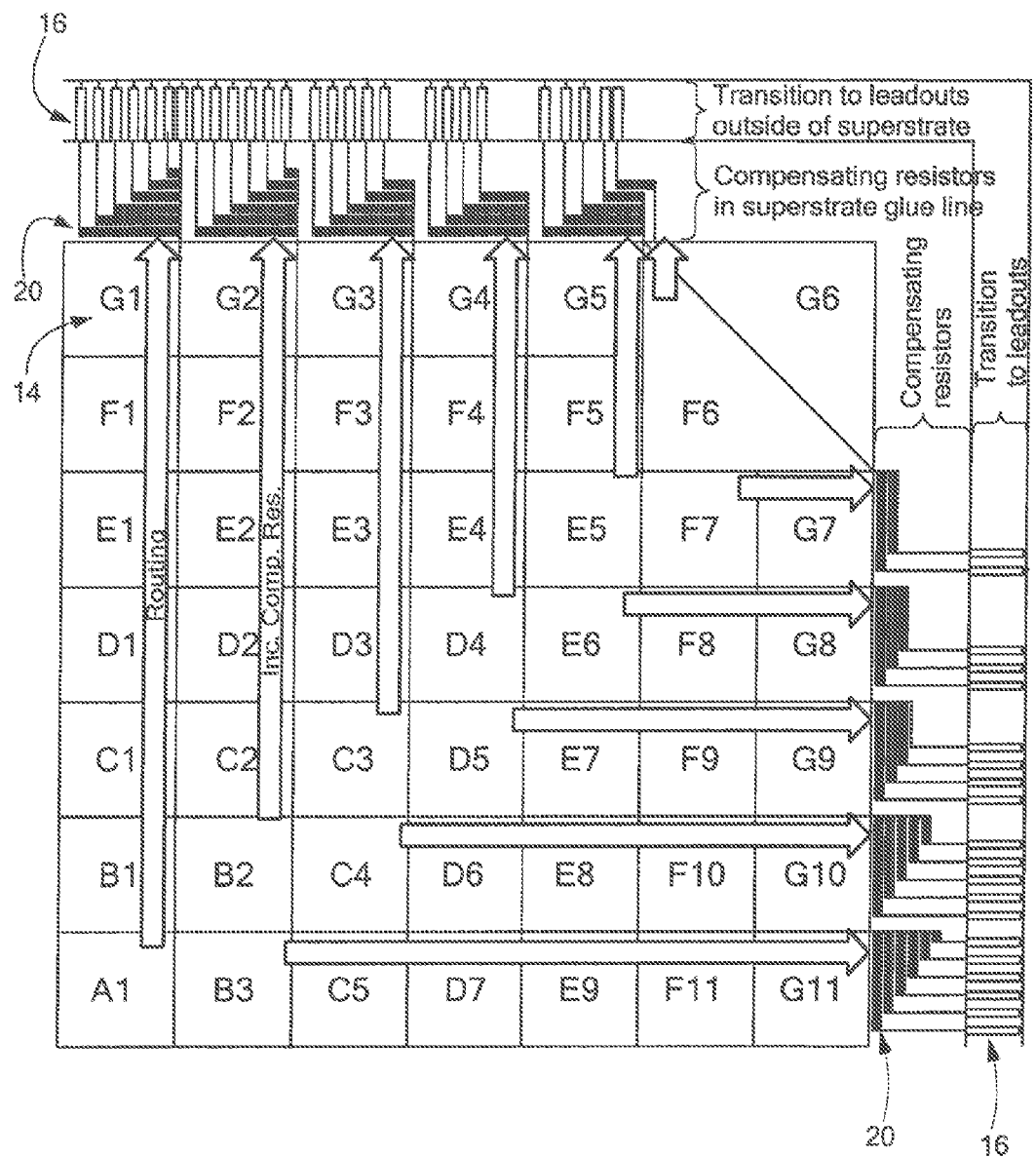

Referring now to FIGS. 3-4B, as noted above, the AO includes a specially designed electrode layout which results in uniform time constants to all pixels across the aperture. As most clearly visible in FIG. 4B, a meander-resistor layout is used to achieve the desired uniform time constants. Each pixel has a capacitance which is known in advance, given its area and the device thickness as well as the properties of the liquid crystal, and thus resistors may be designed which make the product of $R_iC_i$ the same, where i runs over for all pixels. Normally one would determine the resistance and capacitance of the pixel with the largest product (the "slowest" pixel), e.g., one of the pixels in the center of the aperture, whose connection to the edge of the aperture is longest and hence most resistive. For this pixel, here denumerated pixel no. 1, we have some value of $R_1C_1$. The meander resistor chosen for this pixel would be of minimal resistance, preferably zero resistance, i.e., would be absent from the substrate layout. For each of the other pixels, Whose intrinsic $R_{i0}C_i$ (comprising the pixel capacitance $C_i$ and the resistance $R_{i0}$ of the connection from the edge of the aperture to the pixel without adding a compensating resistor) is therefore smaller than $R_1C_1$, a compensating resistor is included in series with the connection. Thus, all pixels are "slowed down" such that they all have substantially the same RC response time.

The above approach enables one to compensate for the effect of voltage attenuation in the RC networks in a uniform manner for all pixels, enabling use of a single calibration table for all pixels, which is a highly desirable feature for obtaining accurate phase control. Compensating resistors 20 may be disposed in the superstrate glue line (i.e. a space into which sealant or "glue" is disposed to form sidewalls and couple a superstrate a substrate) and resistors 20 are coupled via connecting elements 16 which provide a transition to leadouts (and eventually to flex circuits 18a, 18b and controllers) outside of the superstate. As clearly visible in FIGS. 3 and 4, a total of eight meander-resistor layout cell types are needed for pixels in one quadrant of the AO As noted above, an electrode layout which results in uniform time constants to all pixels across the aperture is used. In an optical application in which square beams are used, the pixels are square to better support the intended use of the AO with square beams. It should, of course, be appreciated that the concepts, systems and techniques described herein are not limited to square beams and that any beam shape may be used. Likewise, an AO with a different pixel geometry than square may employ compensation resistors designed according to this teaching. For example, a hexagonal close-packed array, as is known in the art, a useful geometry for an AO. The feed lines for the pixels are of variable length, with longer ones for the central pixels, so the compensation resistor technique here taught is applicable for equalizing the response time and hence enabling more convenient drive voltage circuitry having the same calibration table for all pixels.

Having described one or more preferred embodiments of the circuits, techniques and concepts described herein, it will now become apparent to those of ordinary skill in the art that other embodiments incorporating these circuits, techniques and concepts may be used. Accordingly, it is submitted that that the scope of the patent should not be limited to the described embodiments, but rather, should be limited only by the spirit and scope of the appended claims.

What is claimed is:

1. An adaptive optic actuator comprising:
    a two-dimensional array of pixels; and
    a plurality of electrical signal paths, each of said electrical signal paths coupled to one of the pixels in said two-dimensional array of pixels, wherein each electrical signal path is capable of carrying one or more control signals and is configured such that a substantially uniform time constant is provided to all pixels across said array of pixels wherein at least some of said plurality of electrical sign al paths comprise a compensating resistor to provide the substantially uniform time constant to all pixels across said two-dimensional array of pixels and wherein said compensating resistor is provided as a meander-resistor signal path.

2. The adaptive optic actuator of claim 1 wherein at least some of said electrical signal paths corresponds to a meander-resistor signal path with the layout of each meander-resistor signal path selected to provide a uniform time constant to all pixels across the array of pixels.

3. The adaptive optic actuator of claim 1 wherein each of said pixels in said a two-dimensional array of pixels is provided from a liquid crystal cell comprising:
    a superstrate having an inner surface;

a substrate having an inner surface opposed to the surface of the superstrate, wherein said plurality of electrical signal paths are disposed on one of said substrate and said superstrate.

4. The adaptive optic actuator of claim 1 wherein said liquid crystal cell is provided as a voltage-addressable, transmission-mode, liquid-crystal cell.

5. The adaptive optic actuator of claim 1 wherein at least some of said pixels are provided having a shape corresponding to at least one of: a square cross-sectional shape; and/or a triangular cross-sectional shape.

6. An adaptive optic actuator comprising:
a two-dimensional array of pixels; and
a plurality of electrical signal paths, each of said electrical signal paths coupled to one of the pixels in said two-dimensional array of pixels, wherein each electrical signal path is capable of carrying one or more control signals and is configured such that a substantially uniform time constant is provided to all pixels across said array of pixels wherein at least some of said plurality of electrical sign al paths comprise a compensating resistor to provide the substantially uniform time constant to all pixels across said two-dimensional array of pixels and wherein said compensating resistor is provided as a meander-resistor signal path and wherein each meander-resistor signal path is provided having a resistance value selected to equalize an RC rise time to the associated pixel.

7. The adaptive optic actuator of claim 6 wherein at least some of said electrical signal paths corresponds to a meander-resistor signal path with the layout of each meander-resistor signal path selected to provide a uniform time constant to all pixels across the aperture.

8. The adaptive optic actuator of claim 6 wherein each of said pixels in said a two-dimensional array of pixels is provided from a liquid crystal cell comprising:
a superstrate having an inner surface;
a substrate having an inner surface opposed to the surface of the superstrate, wherein said plurality of electrical signal paths are disposed on one of said substrate and said superstrate.

9. The adaptive optic actuator of claim 6 wherein said liquid crystal cell is provided as a voltage-addressable, transmission-mode, liquid-crystal cell.

10. The adaptive optic actuator of claim 6 wherein at least some of said pixels are provided having a shape corresponding to at least one of: a square cross-sectional shape; and/or a triangular cross-sectional shape.

11. An adaptive optic actuator having a two-dimensional array of pixels each of said pixels each of said pixels having an associated control line electrically coupled thereto with each control line comprising a meander-resistor signal path with the layout of each meander-resistor signal path selected to provide a uniform time constant to all pixels in the two-dimensional array of pixels.

12. The adaptive optic actuator of claim 11 wherein:
each of said pixels in said a two-dimensional array of pixels is provided from a liquid crystal cell comprises: a superstrate having an inner surface; a substrate having an inner surface opposed to the surface of the superstrate and wherein said plurality of electrical signal paths are disposed on one of said substrate and said superstrate; and
said liquid crystal cell is provided as a voltage-addressable, transmission-mode, liquid-crystal cell; and
at least some of said pixels are provided having a shape corresponding to at least one of: a square cross-sectional shape; and/or a triangular cross-sectional shape.

13. The adaptive optic actuator of claim 11 wherein each meander-resistor signal path comprises a resistor having a resistance value selected to equalize an RC rise time to the associated pixel.

* * * * *